March 23, 1926.  1,578,080
S. DEWEY
MOUSE AND RAT TRAP
Filed Feb. 14, 1924   3 Sheets-Sheet 1
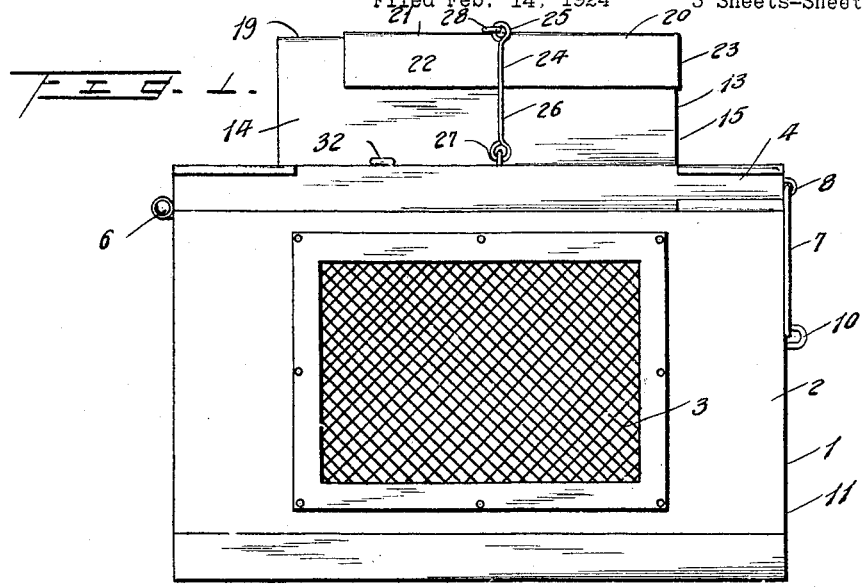
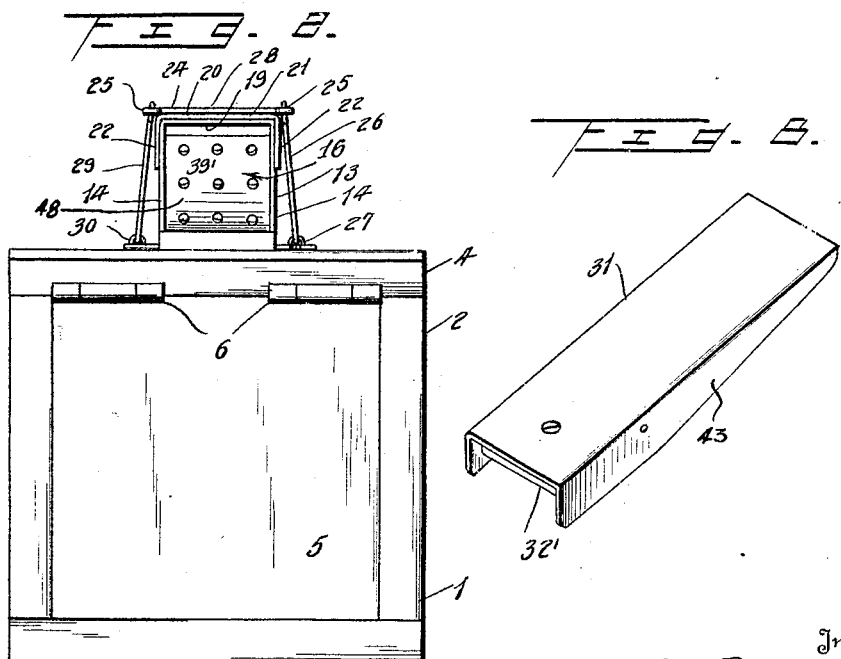
Inventor
S. Dewey,
By (signature)
Attorney

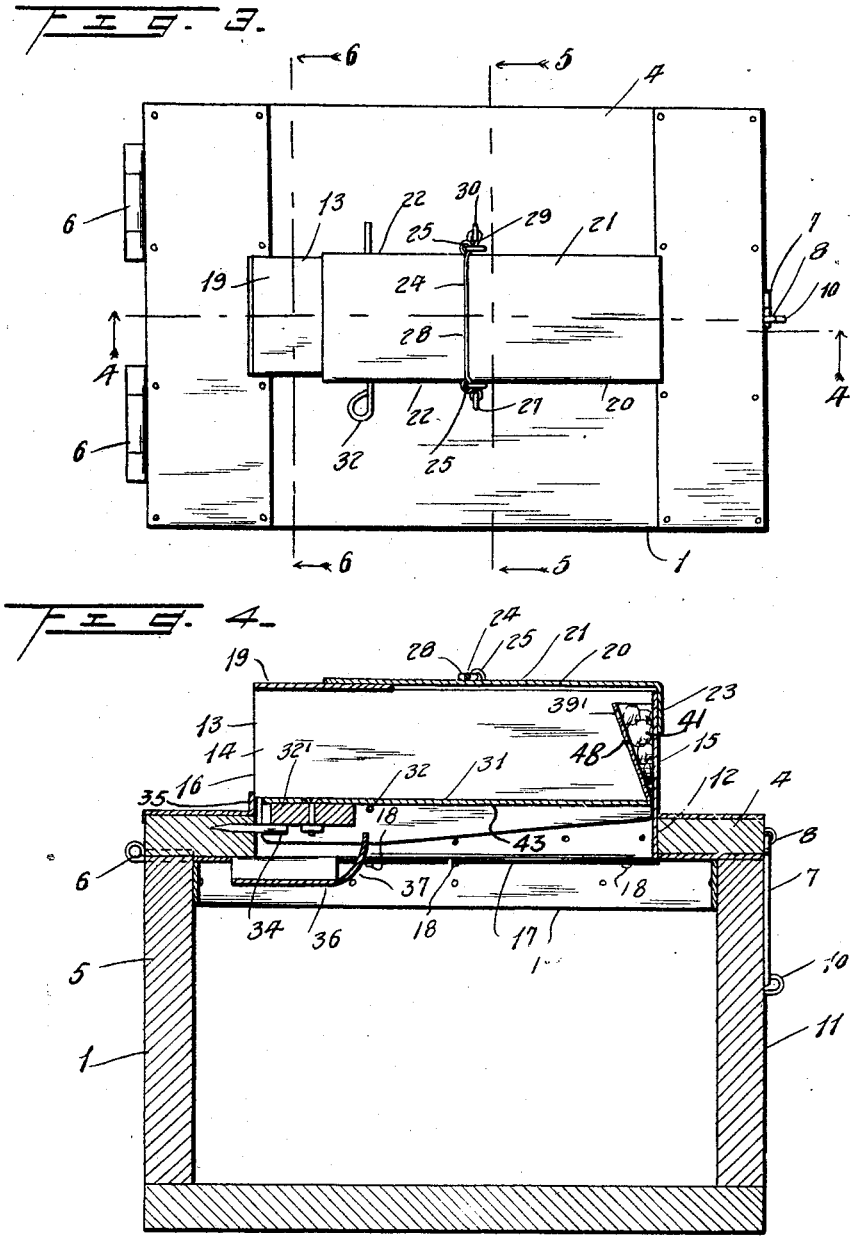

March 23, 1926. 1,578,080
S. DEWEY
MOUSE AND RAT TRAP
Filed Feb. 14, 1924 3 Sheets-Sheet 3
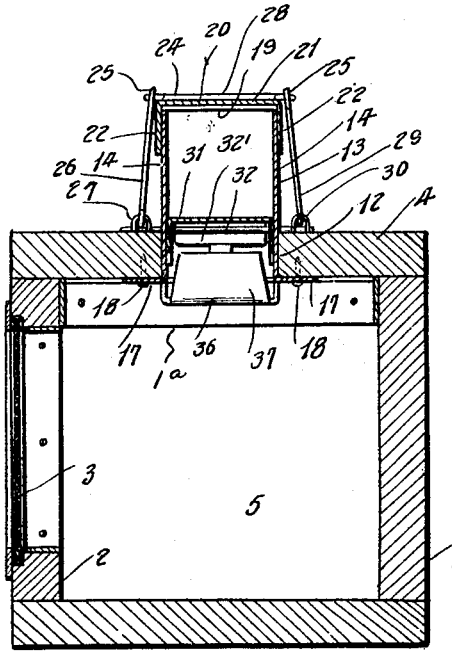
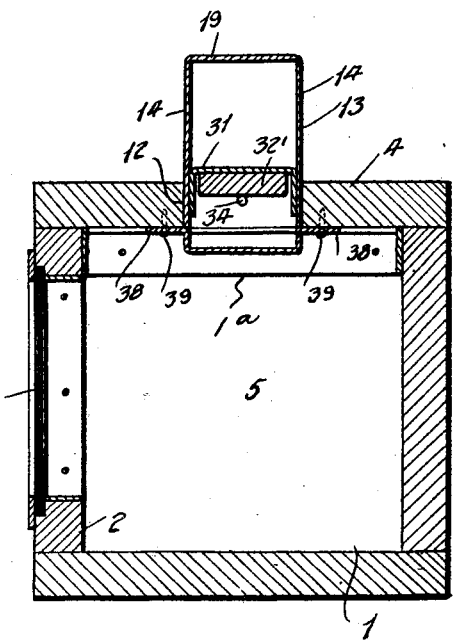
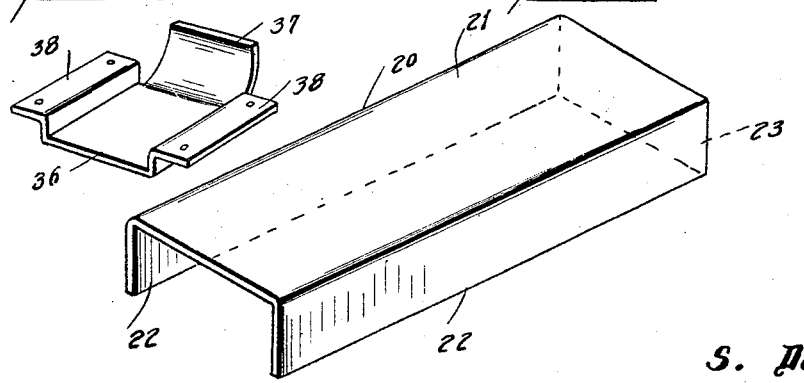
Inventor
S. Dewey,
By
Attorney Patented Mar. 23, 1926.

1,578,080

UNITED STATES PATENT OFFICE.

SAMUEL DEWEY, OF WOLCOTT, INDIANA, ASSIGNOR TO JAMES MILLARD, OF WOLCOTT, INDIANA.

MOUSE AND RAT TRAP.

Application filed February 14, 1924. Serial No. 692,822.

*To all whom it may concern:*

Be it known that I, SAMUEL DEWEY, a citizen of the United States, residing at Wolcott, in the county of White and State of Indiana, have invented certain new and useful Improvements in a Mouse and Rat Trap; and I do hereby declare the following to be a full, clear, and exact description of the invention, such as will enable others skilled in the art to which it appertains to make and use the same.

This invention relates to improvements in traps and has for its object the provision of a trap of the self set and ever set type which shall be comparatively simple, durable and efficient, and which may be manufactured and sold at a comparatively low cost.

With the above and other objects in view the invention consists in the construction, combination and arrangement of parts hereinafter fully described and claimed and illustrated in the accompanying drawings wherein:—

Figure 1 is a view in side elevation of a trap constructed in accordance with my invention.

Figure 2 is a view in end elevation of a trap.

Figure 3 is a top plan view of the trap.

Figure 4 is a section taken on the plane indicated by the line 4—4 of Figure 3.

Figure 5 is a view similar to Figure 4 and taken on the plane indicated by the line 5—5 of Figure 3.

Figure 6 is a similar view taken on the plane indicated by the line 6—6 of Figure 3.

Figure 7 is a detail perspective of the removable cover for the entrance housing of the trap.

Figure 8 is a detail perspective of the tilting platform, and

Figure 9 is a detail perspective view of the guard.

Referring to the drawings by reference numerals, 1 designates the body or well of the trap all but the wall 2 of which is imperforate. Wall 2 is provided with a light opening on which is secured in any suitable manner a transparent panel 3. A strip of metal 1ª is secured around the inner side of walls 1 and 2 and serves to reinforce the top edges of the walls. The top 4 of the trap is secured at one end to the end wall 5 of the trap by hinges 6. The top 4 is secured in closed position by hook 7 which is pivoted at 8 to the end edge of the cover and which has removable engagement with a loop 10 carried by an end wall 11 of the body or well. The top 4 is provided centrally thereof with an elongated opening 12 through which projects a housing member 13 having side walls 14 and an end wall 15. As shown the member 13 has an entrance at 16, and the lower edges of the walls 14 extend through the opening 12 and are bent at right angles and provide flanges 17 through which nails or the like 18, may be driven to secure the housing member in place. The rearward portion of the housing member 13 adjacent the entrance 16, is permanently covered by a plate 19 and the remainder of the housing is covered by a removable cover section 20. The cover section 20 as clearly shown in Figure 7 consists of a top plate 21 having depending side walls 22 and an end wall 23, which walls engage the walls 14 and 15 of the housing member 13 when the cover section is in position on the trap. The cover section is removably secured in place by a jointed fastener member 24 preferably consisting of three links pivoted together as at 25. The link 26, is secured to the top of the box by a staple or the like at 27 and when in operative position it extends upward at the side of and to the top of the housing 13 where it is connected to the horizontal link 28 extending across the top of the cover section 20 and which at its opposite end is connected to the vertical link 29 extending downwardly of the side wall of the housing 13 at a point substantially opposite to the point at which the link 26 extends upwardly thereof and the link 29 at its lower end is adapted to engage with a loop 30 carried by the cover of the box, and when the link 29 is still engaged with the loop 30 the cover section will be securely fastened in place.

Mounted within the opening 12 in the cover section 4 is a platform 31 pivoted at 32 and provided at its rearward end with a snap weight 32′ by means of which it is normally held in a horizontal position. Secured in the edge 33 of the opening 12 there is a stop pin 34 being so arranged as to be engaged by the rearward under edge 35 of the platform 31 and thereby prevents the rearward edge of the platform from being moved downward below the horizontal by the snap weight 32'.

Firmly attached to the under side of the cover 4 at the rearward end of the elongated opening 12 is the guard plate 36, having upwardly extending side walls carrying laterally extending flanges 38 secured to the top as by nails 39. Extending outwardly and upwardly from the front edge of the guard plate 36 is a tongue 37 which as shown conceals the snap weight 32' and prevents access being had from the interior of the trap to that end of the opening 12 normally covered by the weighted end of the platform. It will be apparent that the guard plate 36 will prevent the escape of an imprisoned animal through the end of the opening 12 normally covered by the weighted end of the platform. Without the guard plate 36 an imprisoned animal might by a slight upward pressure on the weighted end of the pivoted platform 31 cause the same to tilt and thereby present a means of escape. The forward edges or tongues 37 of the guard-plate 36 is engaged by the downwardly turned edges 43 of the platform 31 when the platform tilts and thereby prevent the platform from moving through an arc greater than ninety degrees and permitting the weighted portion of the platform moving to the forward side of the pivot 32.

Within the housing 13 at the forward end thereof is a bait holder 39' formed by the end wall 15 of the housing and by a perforated partition wall 48 extending between the side walls 14 of the housing member 13. The bait 41 within the bait holder 39' may be moved and replaced by the removal of the cover section, which as will now be readily understood may be quickly and easily removed by the unfastening of the link member 24.

In operation the animal will enter the housing 13 at the entrance 16 and proceeding on the platform 31 towards the bait 41, his weight will cause the platform to tilt, the inner walls of the housing and the upper surface of the platform being smooth he will slide helplessly into the well or body 1 of the trap, where he will be imprisoned until the party setting the trap opens the same.

Having described the invention what I claim is:—

A trap comprising a body providing a captive chamber, a cover therefor having an entrance opening therethrough, a housing surrounding and set into said opening and having an entrance opening at one end, a bait holder in said housing, a tiltable platform having a weight at one end positioned within the housing, a stop pin on the cover engageable by said weight, said platform having depending flanges at the sides thereof, a removable cover for the housing to permit access to the bait holder, means to fasten the cover in bait-concealing position, and a guard member on the cover positioned below said weight and pin having its free end deflected toward the platform and disposed between said flanges and preventing escape of a captive at the weight end of the platform.

In testimony whereof I affix my signature.

SAMUEL $\overset{\text{his}}{\times}$ DEWEY.
mark